Feb. 23, 1954  J. H. BERTIN ET AL  2,670,011
AERODYNAMIC VALVE
Filed Oct. 26, 1948
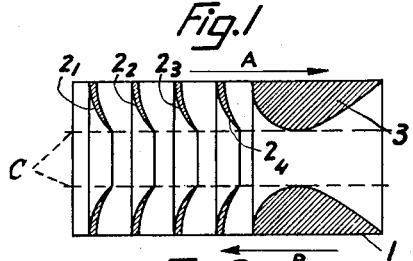
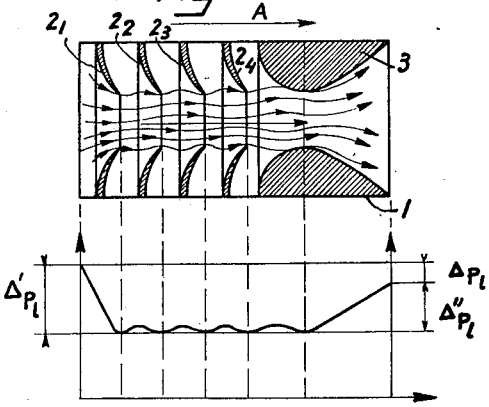
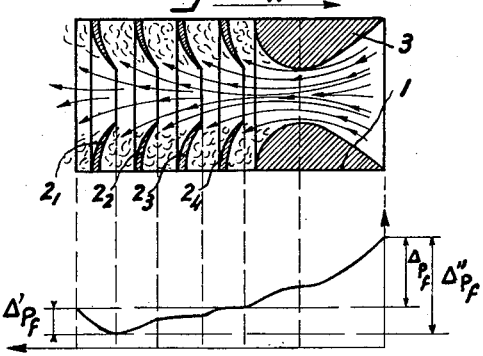
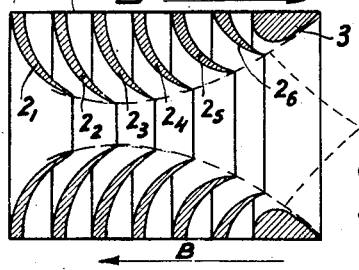
INVENTOR
Jean H. Bertin +
Francois G. Paris
By Watson, Cole, Grindle + Watson

UNITED STATES PATENT OFFICE 2,670,011

AERODYNAMIC VALVE

Jean H. Bertin and François G. Paris, Paris, France, assignors to Societe Nationale d'Etude et de Construction de Moteurs d'Aviation, Paris, France, a company of France Application October 26, 1948, Serial No. 56,582

Claims priority, application France October 31, 1947

5 Claims. (Cl. 138—44)

Our invention has for its object an arrangement providing a loss of head or a resistance for a gasiform stream that is small in one direction and considerable in the other direction, without its being necessary to resort to any movable mechanical members, this difference in action being provided by resorting to the laws governing the flow of gases so that the device may well be termed an aerodynamic valve.

This arrangement allows furthering the direction of flow in a predetermined direction inside a circuit of gases or vapors. When applied for instance to the exhaust of internal combustion or explosion engines, it allows improving the scavenging of the cylinders by preventing the rearward movement of the burnt gases, which is of particular interest whenever the exhaust gases are to feed a gas turbine as used for instance for driving a supercharger. But such an application mentioned merely by way of example should not be construed in a limiting manner and the apparatus may be used to advantage in all cases whereby reason of the fluctuations impressed to the progress of the gasiform stream, it is important to constrain said gases to advance in a single direction.

Our improved arrangement covers the association of a succession of nozzles all converging in the direction of flow that is to be furthered, with a diffusor mounted at the downstream end of said succession of nozzles in the direction considered. This diffusor may be constituted by a dissymmetrical Venturi-shaped member, the part of this member of which the free cross sectional area varies more slowly being located in the downstream side in the allowed direction of flow.

The input of fluid into the arrangement and its output may be provided along a common straight line which is an important advantage.

We have described hereinafter with reference to accompanying drawings given by way of example and by no means in a limiting sense an embodiment that will allow understanding how the invention may be properly executed, the features appearing both in the drawings and in the specification forming obviously part of the invention. In said drawings:

Fig. 1 illustrates in axial cross section a first embodiment of an arrangement according to our invention.

Fig. 2 is a diagram illustrating the flow of gases in the allowed direction with a graph showing the variations in pressure along the arrangement.

Fig. 3 is a similar diagram for the case where the flow is executed in the reverse or braked direction.

Fig. 4 is an axial cross section of a further embodiment of an arrangement according to our invention.

The embodiment illustrated in Fig. 1 includes a tubular section 1 that is to form part of a pipe system through which a pulsatory gasiform flow passes, a series of successive converging annular baffles forming discharge nozzles $2_1$—$2_2$—$2_3$—$2_4$ and a Venturi-shaped member 3 beyond same. The direction of the allowed or free flow is that illustrated by the arrow A while the direction of the braked or hindered flow is illustrated by the arrow B and consequently the nozzles converge in the direction of the arrow A and the Venturi-shaped member 3 is arranged on the downstream side of the nozzles in the direction A; said member 3 is dissymmetrical and the portion thereof wherein the cross sectional area varies more rapidly is located foremost immediately beyond the downstream end of the nozzle system. The arrangement works in the following manner:

When the flow of fluid progresses in the direction of the arrow A, the first nozzle $2_1$ has for its action merely to restrict the gasiform stream while reducing its pressure and increasing its speed. Each of the following nozzles $2_2$—$2_3$—$2_4$ receives the stream from the preceding nozzles before its elementary streamlines, that are properly guided in the direction of flow, may diverge to any substantial extent, the spacing between the nozzles being suitably designed to this purpose. The speed and pressure of the gas in the stream, as considered in the first nozzle, remain substantially constant up to the entrance into the restricted portion of the Venturi-shaped member 3. Beyond said portion the gasiform stream enters the downstream end of the member 3, the cross section of which varies more slowly than in the input end. Consequently the high speed of the stream when considered in the restricted portion of member 3 may be damped with a good efficiency inside the diffusor formed by the Venturi-shaped member for the direction of flow considered, the wall of which flares out to a small extent only. The pressure thus recovered $\Delta''pl$ (Fig. 2) is to be deducted from the loss of head $\Delta'pl$ to which the fluid is submitted as it enters the first nozzle and which corresponds to the minimum pressure required for ensuring the throughput through the smallest cross sectional area provided by the arrangement. The actual loss of load produced by the arrangement is finally $$\Delta pl = \Delta'pl - \Delta''pl$$

where $\Delta pl$ is very much less than $\Delta'pl$.

In the direction of flow corresponding to the arrow A, the flow is thus executed under excellent conditions.

When, on the contrary, the gases have a tendency to flow backwards in the direction of the arrow B, they meet first the slightly tapering portion of the Venturi-shaped member 3. At the restricted portion of the latter, the speed obtained is considerable and by reason of the very large angle of divergence of the second portion of the member 3 that the stream meets thereafter, the elementary streamlines of the stream open rapidly and, by reason of the shape of the nozzles, the sharp edges of which are directed towards the flow of gasiform fluid, said elementary streamlines cannot be taken up under good conditions by said nozzles. The flow is submitted to a further loss of head each time it passes through one of the successive nozzles.

At the moment at which the flow passes through the opening of the last nozzle $2_1$, it moves with a certain speed that is damped and may as precedingly be transformed into pressure so as to reduce the loss of head it is submitted to. But in the case considered, it is necessary on the contrary that this loss of head may be as high as possible. We provide for this, by constraining the elementary streamlines to move away as far as possible from the walls so that no rational damping of the speed may be obtained. It is necessary to this purpose that $\Delta'pf$ (Fig. 3) may be as small as possible; this requires, generally speaking, that the slope of the nozzles 2 may be sufficiently rapid.

With an arrangement so designed the loss of head in the braked direction $$\Delta pf = \Delta''pf - \Delta'pf$$

is much higher (six to eight times) than that in the opposite allowed direction $$\Delta pl = \Delta'pl - \Delta''pl$$

The advantageous properties of the arrangement depend to a considerable amount on the distance between the nozzles 2. A testing under permanent flow conditions and then under pulsatory conditions will allow defining for each case the optimum spacing between nozzles.

The apparatus illustrated in Fig. 4 includes the same members as in the case of Fig. 1: a channel 1 containing a series of convergent annular baffles forming discharge nozzles $2_1$—$2_2$—$2_3$—$2_4$ and a Venturi-shaped member 3. But the nozzle openings instead of all having the same cross sectional area have different opening areas and are arranged in a manner such that their shape as a whole may correspond to the outline of a dissymmetrical Venturi-shaped member. In other words, whereas in the embodiment of Fig. 1 the periphery of the openings of the nozzles and a part of the neck or narrowest zone of the venturi 3, lie on a cylindrical envelope surface C (shown in dotted line), in the embodiment of Fig. 4, the envelope surface S (also shown in dotted line) has a convergent-divergent shape, the convergent portion being shorter than the divergent portion which merges with a divergent part of the venturi.

The direction of allowed flow is again that given out by the arrow A while the opposed braked direction is given out by the arrow B.

The operation is substantially the same, but the length of the apparatus is less which may be of interest for alternating operation, the gaseous mass submitted to reversal of speed being smaller.

Obviously the above disclosed embodiments have been illustrated by way of exemplification and it is possible to substitute for their constituent parts equivalent technical means, without unduly widening thereby the scope of the invention as defined in accompanying claims.

What we claim is:

1. A unidirectional flow duct for allowing free downstream flow and hindering upstream flow, comprising in combination a plurality of dish-shaped annular baffles annularly engaging the inner wall of said duct and being longitudinally spaced therealong, and forming coaxial, converging passages, the least cross-sectional area of said passages being at the downstream end thereof, downstream of said baffles, an annular Venturi member, inside said duct, forming a converging-diverging passage having a neck portion of least cross-sectional area and coaxial with the former-mentioned passages, the periphery of the downstream ends of said converging passages and the periphery of the neck portion of said converging-diverging passage lying on a smooth envelope surface.

2. A unidirectional flow duct according to claim 1, wherein the converging part of said Venturi member is substantially shorter than the diverging part thereof.

3. A unidirectional flow duct for allowing free downstream flow and hindering upstream flow, comprising in combination a plurality of dish-shaped annular baffles annularly engaging the inner wall of said duct and being longitudinally spaced therealong, and forming coaxial, converging passages, the least cross-sectional area of said passages being at the downstream end thereof, downstream of said baffles, an annular Venturi member, inside said duct, forming a converging-diverging passage having a neck portion of least cross-sectional area and coaxial with the former-mentioned passages, the periphery of the downstream ends of said converging passages and the periphery of the neck portion of said converging-diverging passage lying on a smooth, converging-diverging envelope surface blending, at one end thereof, with the converging surface of the farthest upstream baffle and, at the other end thereof, with the diverging surface of said Venturi member.

4. A unidirectional flow duct according to claim 3, wherein the converging part of said envelope surface is substantially shorter than the diverging part thereof.

5. A unidirectional flow duct according to claim 1, wherein said envelope surface is of cylindrical shape.

JEAN H. BERTIN.
FRANÇOIS G. PARIS.

References Cited in the file of this patent

UNITED STATES PATENTS

| Number | Name | Date |
|---|---|---|
| 1,559,155 | Bullock | Oct. 27, 1925 |
| 1,663,998 | Schmidt | Mar. 27, 1928 |
| 1,697,344 | Campbell | Jan. 1, 1929 |
| 1,802,766 | Kerr | Apr. 28, 1931 |
| 1,867,876 | Clark | July 19, 1932 |
| 2,346,178 | Mercier | Apr. 11, 1944 |

FOREIGN PATENTS

| Number | Country | Date |
|---|---|---|
| 330,151 | Germany | Oct. 10, 1919 |